(12) United States Patent
Boria et al.

(10) Patent No.: US 10,639,804 B2
(45) Date of Patent: May 5, 2020

(54) CLAMPING SYSTEMS AND METHODS FOR ROBOTIC TOOLS

(71) Applicants: AEA SRL, Angegli di Rosora (IT); Airbus SAS, Blagnac (FR)

(72) Inventors: Sébastien Boria, Toulouse (FR); Fabien Albert, La Baule (FR); Pierre Lepine, Saint Etienne de Montluc (FR); Luca Lattanzi, Ancona (IT); Cristina Cristalli, Jesi (IT); Enrico Concettoni, Jesi (IT)

(*) Notice: Subject to any disclaimer, the term of this patent is extended or adjusted under 35 U.S.C. 154(b) by 198 days.

(21) Appl. No.: 15/909,709

(22) Filed: Mar. 1, 2018

(65) Prior Publication Data

US 2018/0250833 A1 Sep. 6, 2018

(30) Foreign Application Priority Data

Mar. 1, 2017 (EP) .................................. 17158772

(51) Int. Cl.
| | |
|---|---|
| B25J 15/06 | (2006.01) |
| B25J 15/00 | (2006.01) |
| B25J 11/00 | (2006.01) |
| B64F 5/40 | (2017.01) |
| B64F 5/10 | (2017.01) |
| B25H 1/00 | (2006.01) |
| B23Q 17/22 | (2006.01) |
| B21J 15/14 | (2006.01) |

(Continued)

(52) U.S. Cl.
CPC ......... B25J 15/0683 (2013.01); B21J 15/142 (2013.01); B23B 49/026 (2013.01); B23Q 9/0014 (2013.01); B23Q 17/2233 (2013.01); B25H 1/0064 (2013.01); B25J 11/005 (2013.01); B25J 15/0061 (2013.01); B25J 15/0095 (2013.01); B64F 5/10 (2017.01); B64F 5/40 (2017.01); B23B 2215/04 (2013.01); B23B 2260/118 (2013.01); B23P 2700/01 (2013.01)

(58) Field of Classification Search
CPC . B25B 11/005; B25J 15/0052; B25J 15/0061; B65G 47/91; B65G 47/918
See application file for complete search history.

(56) References Cited

U.S. PATENT DOCUMENTS

| | | | |
|---|---|---|---|
| 1,228,690 A * | 6/1917 | Monnet | ............... B66C 1/0212 294/65 |
| 4,523,100 A | 6/1985 | Payne | |

(Continued)

FOREIGN PATENT DOCUMENTS

| | | |
|---|---|---|
| EP | 1652635 | 5/2006 |
| JP | S60242939 | 12/1985 |
| JP | H11 221707 | 8/1999 |

OTHER PUBLICATIONS

European Search Report, dated Aug. 31, 2017, priority document.

*Primary Examiner* — Tyrone V Hall, Jr.

(74) *Attorney, Agent, or Firm* — Greer, Burns & Crain, Ltd.

(57) ABSTRACT

An apparatus for clamping a robotically controlled tool to a workpiece comprises a tool support mountable on a robotic arm and configured to support the tool, a plurality of clamping modules, each of which includes at least one vacuum cup arranged to clamp the tool support to the workpiece, and an adjustment mechanism configured to adjust the position of the tool support relative to the workpiece.

13 Claims, 12 Drawing Sheets

(51) Int. Cl.
*B23Q 9/00* (2006.01)
*B23B 49/02* (2006.01)

(56) References Cited

U.S. PATENT DOCUMENTS

| | | | | |
|---|---|---|---|---|
| 4,613,262 A * | 9/1986 | Woods | ................ | B23Q 9/0014 |
| | | | | 408/111 |
| 5,290,134 A * | 3/1994 | Baba | ................ | G01R 31/2851 |
| | | | | 414/404 |
| 5,383,751 A * | 1/1995 | Wheetley | ................ | B23B 39/00 |
| | | | | 408/1 R |
| 5,387,068 A * | 2/1995 | Pearson | ............... | B25J 15/0616 |
| | | | | 294/65 |
| 5,575,376 A * | 11/1996 | Colamussi | ........... | B65G 47/918 |
| | | | | 198/468.3 |
| 5,609,377 A * | 3/1997 | Tanaka | ................ | B65G 47/918 |
| | | | | 294/65 |
| 5,622,362 A * | 4/1997 | Shiiki | ................ | B65H 3/0816 |
| | | | | 271/106 |
| 6,068,317 A * | 5/2000 | Park | ........................ | H01L 21/68 |
| | | | | 294/87.1 |
| 6,439,631 B1 * | 8/2002 | Kress | ................ | B65G 47/918 |
| | | | | 294/65 |
| 7,798,546 B2 * | 9/2010 | Kniss | ................ | B25J 15/0052 |
| | | | | 294/65 |
| 8,240,726 B2 * | 8/2012 | Subotincic | ........... | B25J 15/0052 |
| | | | | 294/65 |
| 2006/0143890 A1 | 7/2006 | Linnenmann et al. | | |
| 2009/0292298 A1 * | 11/2009 | Lin | ..................... | B25J 15/0052 |
| | | | | 606/130 |

\* cited by examiner

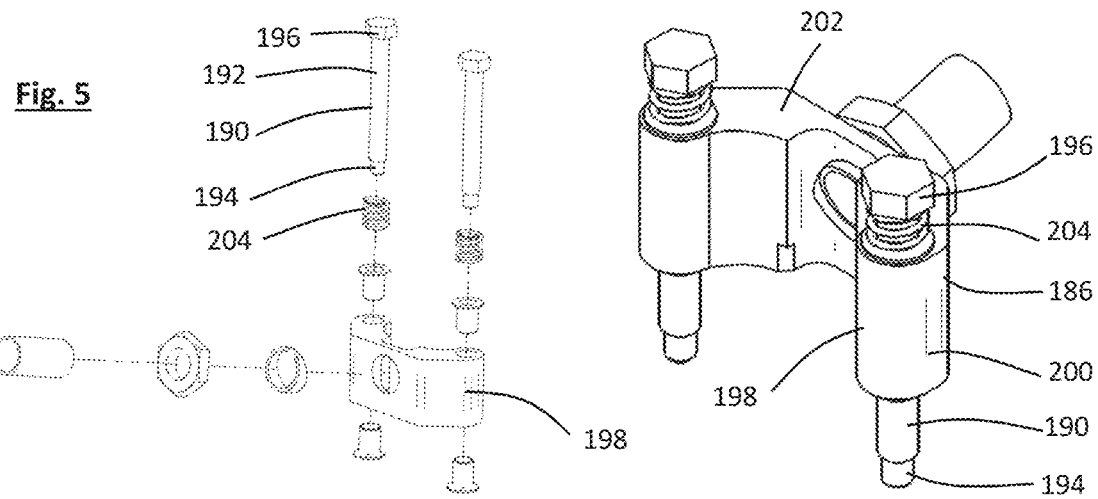
Fig. 5
Fig. 6
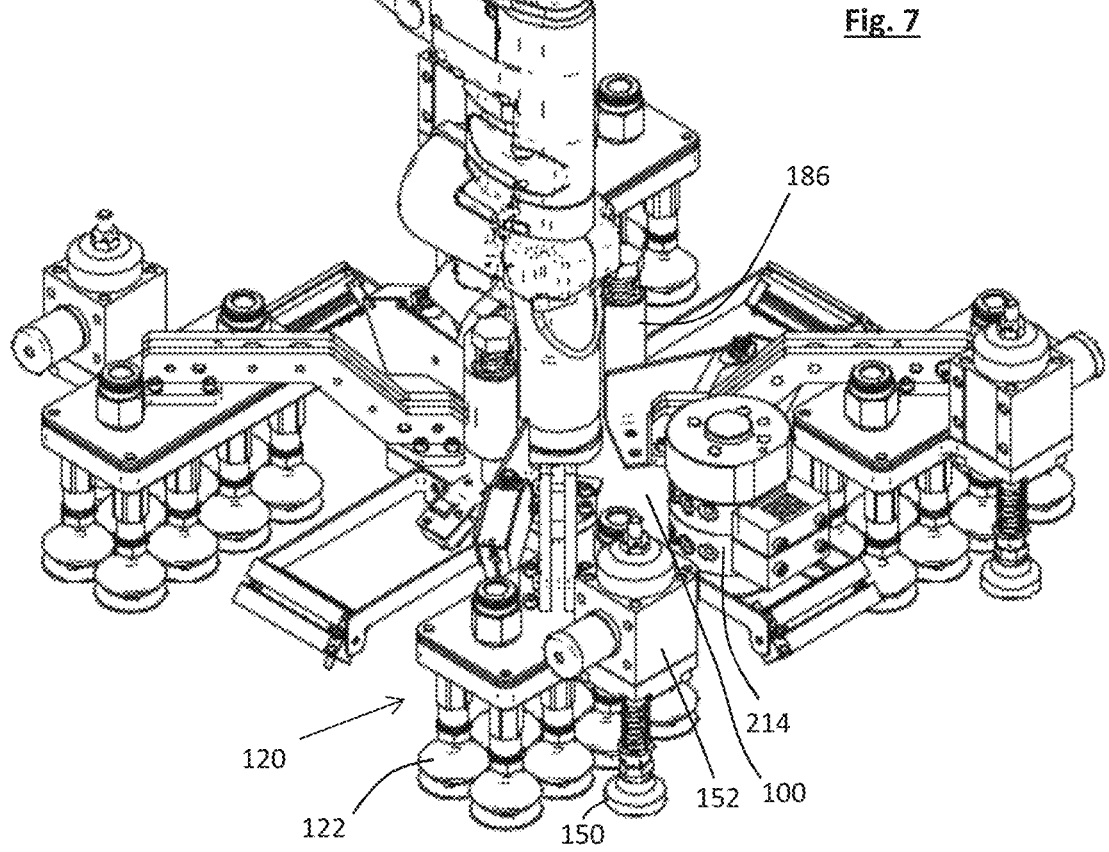
Fig. 7

CLAMPING SYSTEMS AND METHODS FOR ROBOTIC TOOLS

CROSS-REFERENCES TO RELATED APPLICATIONS

This application claims the benefit of the European patent application No. 17158772.8 filed on Mar. 1, 2017, the entire disclosures of which are incorporated herein by way of reference.

FIELD OF THE INVENTION

The present invention relates to clamping systems and methods for robotic tools, and, in particular, to the clamping of robotic tools to workpieces on which the tools operate.

BACKGROUND OF THE INVENTION

Robotically operated tools are widely used in a variety of applications, including the manufacture of vehicles such as aircraft. A robot typically includes a robotic arm with an end-effector on which the tool is mounted. For the robotic arm to be easily installed and reconfigured according to variations in the manufacturing process and environment, it is desirable for the arm to be light. However, if the tool is required to apply a force to the workpiece, for example during drilling or riveting, then, if this force is reacted through the robotic arm, the arm needs to be sufficiently stiff to sustain the necessary reactive force and to avoid a position slippage during the process. These two requirements are therefore to some extent conflicting.

SUMMARY OF THE INVENTION

The present invention provides, according to a first aspect, an apparatus for clamping a robotically controlled tool to a workpiece, the apparatus comprising: a tool support mountable on a robotic arm and arranged to support the tool; a plurality of clamping modules each of which includes at least one clamping device arranged to clamp the tool support to the workpiece and an adjustment mechanism arranged to allow adjustment of the position of the tool support relative to the workpiece. Clamping of the tool support to the workpiece can reduce the loads that the robot needs to provide or sustain during operation of the tool on the workpiece.

The clamping device may be any suitable device which can be activated and deactivated to clamp the tool support to the workpiece and release it. For example, it may be a vacuum cup, or it may be a van der Waals clamp, or an electromagnet if the workpiece is ferromagnetic.

The adjustment mechanism may be arranged to adjust the spacing between the tool support and the workpiece. For example, it may be arranged to adjust the position in which the tool support is fixed when the vacuum cups are activated.

The adjustment mechanism may comprise a contact member movable relative to the tool support to allow relative movement of the tool support and the workpiece while the contact member is in contact with the workpiece. The apparatus may further comprise locking means arranged to lock each of the contact members relative to the tool support so as to fix the location and the orientation of the tool support relative to the workpiece during, or after, activation of the clamping devices. This arrangement means that the position of the tool support can be adjusted while it is fully mobile prior to clamping, and then clamped by means of the clamping devices without disturbing the tool support from its selected position and orientation. Alternatively, the adjustment mechanism may act between the clamping devices and the tool support. This may mean that the adjustment of the tool support will be carried out after the clamping devices have been activated, which can limit the freedom of movement of the tool support during the adjustment, or that some movement of the tool during activation of the clamping devices will occur, which will be acceptable in some circumstances.

Each of the contact members may comprise a shaft that is slidably mounted on the tool support, for example being mounted in the clamping module, so as to be movable relative to the tool support. Each of the contact members may be movable between an extended position in which it will first contact the workpiece and a retracted position. Each of the contact members may be spring biased towards the extended position.

The at least one clamping device on each clamping module may comprise a plurality of vacuum cups. Each of the clamping modules may further comprise a respective vacuum chamber housing which defines a vacuum chamber connected to all of the plurality of vacuum cups. Each of the vacuum cups of each module may be connected to the vacuum chamber via an auto-excluding valve which is arranged to disconnect the vacuum cup from the vacuum chamber in the event of a leak in the vacuum cup. In each of the clamping modules, the plurality of vacuum cups may be mounted on the vacuum chamber housing, and the vacuum chamber housing may be rigidly connected to the tool support, for example by means of a support arm.

The apparatus may further comprise at least one sensor arranged to sense the position of the tool support relative to the workpiece. For example, any one or more of the following may be used: cameras, optical sensors including laser sensors, sliding contact sensors with linear encoders, or linear variable differential transformers (LVDTs).

The tool support may comprise a sliding mounting arranged to mount the tool on the tool support so that it can be moved on the sliding mounting relative to the tool support. For example, the tool may be spring biased along the sliding mounting towards the workpiece.

The apparatus may further comprise a robotic arm. The tool support may be mounted on the robotic arm. The robotic arm may be arranged to move the tool support so as to bring the clamping devices into contact with the workpiece.

The apparatus may further comprise an electronic control unit. The apparatus may further comprise a vacuum pump. The tool support may be mounted on the robotic arm by means of a connector. The connector may be arranged to connect the vacuum cups to the vacuum pump. The connector may be arranged to connect the at least one sensor to the electronic control unit.

The invention further provides, according to a second aspect, a method of clamping a robotically operated tool to a workpiece, the method comprising:
  providing apparatus according to the first aspect of the invention with a tool mounted on the tool support;
  moving the tool support to a position where the tool and the clamping devices are in contact with the workpiece; and activating the clamping devices to clamp the tool to the workpiece.

Where each adjusting mechanism comprises a movable contact member, and when the tool support is in this position, the contact members also contact the workpiece, the method may further comprise locking the contact members relative to the tool support prior to activating the clamping devices, or alternatively after activating the clamping devices.

The system may further comprise any one or more features of the preferred embodiments of the invention which are shown by way of example only in the accompanying drawings, and the method may further comprise any one or more steps of the preferred embodiments, as will now be described.

BRIEF DESCRIPTION OF THE DRAWINGS

FIG. 5 is an exploded view of a sliding mounting for integrating a standard hand-held pneumatic drill with concentric collet mechanism into the clamping system of FIG. 1;

FIG. 6 is a detailed perspective view of the sliding mounting of FIG. 5;

FIG. 7 is a perspective views of the clamping system of FIG. 1 with a drilling unit connected to it;

DETAILED DESCRIPTION OF THE PREFERRED EMBODIMENTS

Figure 1:
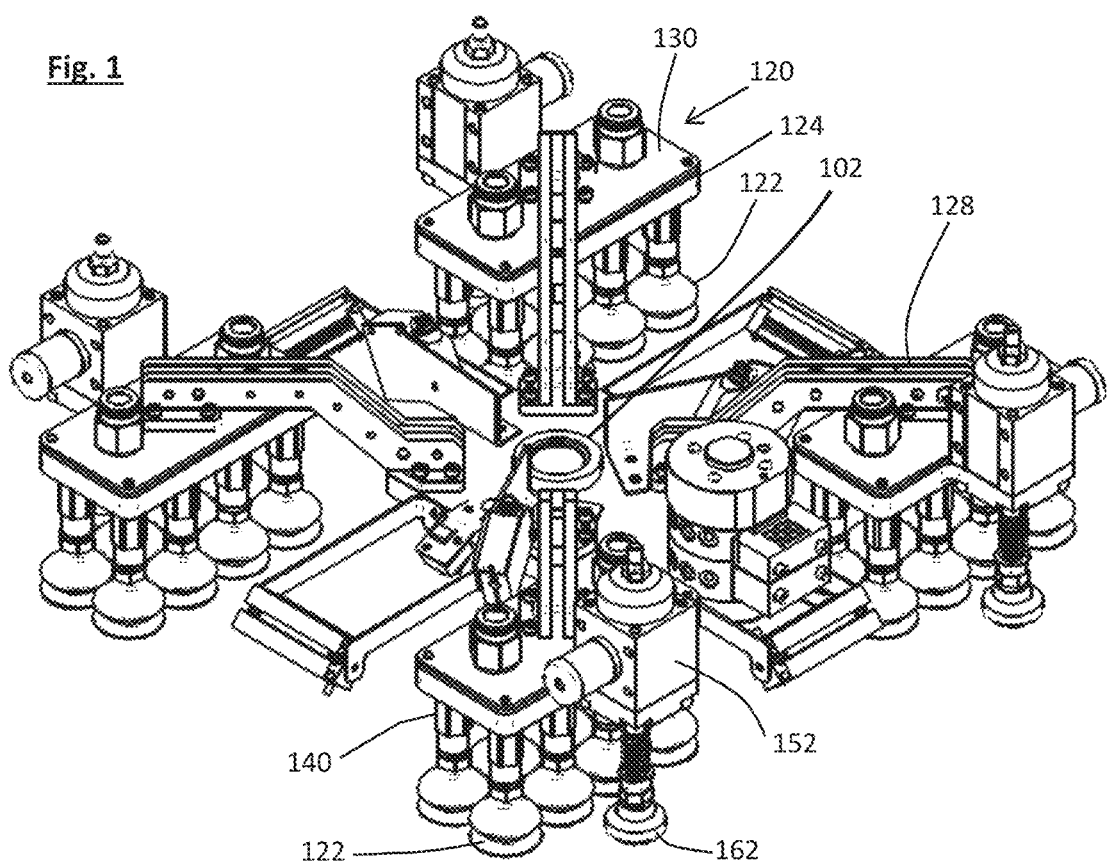
FIG. 1 is a perspective view from above of a clamping system embodying the present invention.

The clamping system comprises a tool support 100, which may comprise a bush 102 arranged to receive and support a tool such as a drill or riveter. The tool support 100 may further comprise a support plate 104 in which the bush 102 is mounted. The support plate 104 may be substantially rectangular. A plurality of clamping modules 120 may be connected to the tool support 100. The clamping modules 120 may be movable with respect to the tool support 100 (e.g., pneumatically or electrically controlled movement). Each of the clamping modules may each comprise a group of suction cups 122, which may be mounted on a common mounting member, which may conveniently comprise a vacuum housing 124. The vacuum housing 124 may define a vacuum chamber 126. The vacuum chamber 126 may be pneumatically connected to all of the suction cups 122 in the group so that vacuum in the vacuum chamber 126 can be used to activate all of the suction cups 122 in the group. Each of the clamping modules may be connected to the tool support 100, for example by means of a support arm 128 as shown, or a slidably movable shaft which can be pneumatically or electrically locked before the activation of the suction cups 122 as will be described in more detail below. The connection between the tool support 100 and each of the clamping modules 120 may either be rigid or movable, and the support arms 128 may each be simply bolted or welded at one end to the support plate 104 and at the other end to one of the vacuum housings 124.

The vacuum housing 124 of each module may be of a generally flat rectangular shape, having upper 130 and lower 132 surfaces which are parallel to the upper and lower surfaces 134, 136 of the support plate 104. Each of the vacuum housings 124 may be connected to a respective corner of the support plate 104 so that the support plate 124 is supported centrally between the four clamping modules 120.

The lower surfaces 132 of all of the vacuum housings 124 may lie in a common plane so that the suction cups 122 in all groups are level with each other. Specifically, each of the vacuum cups 122 may be connected to the vacuum housing 124 by means of a rigid cup connector 140, which defines a conduit between the chamber 126 and the cup 122, and may incorporate an auto-excluding valve 141, and which thereby connects the vacuum cup 122 pneumatically to the vacuum chamber 126. Each of the cup connectors 140 may project from the lower surface 132 and may have a central axis which is perpendicular to the lower surface 132, and each of the cup connectors 140 may be connected to the back of one of the vacuum cups 122. The vacuum cups 122 may be formed of a flexible elastomeric material such that they have a relaxed shape when not under any deforming force, and may each have a contact rim 142 which may, when the cup 122 is in its relaxed state, be circular and lie in a plane. All of the cup connectors 140 may be the same length as each other and all of the cups 122 may be of the same size and shape. The contact rims 142 of all of the cups 122 in each group may therefore lie in a common plane. This allows them to engage easily with a flat or substantially flat workpiece. The suction cups 122 in each module may be arranged, for example, in a square array. For example, there may be two rows of four cups 122 on each module as shown, but clearly the exact number and position of cups can be chosen depending on the application.

It will be appreciated that, while in the embodiment shown in the drawings all of the vacuum cups 122 in each group, and indeed in all of the groups are aligned in a co-planar manner so as to be used with a flat or substantially flat workpiece. However, the vacuum cups 122 are compliant and during work-piece approach they can be compressed. This allows the clamping system to operate effectively even if the surface of the workpiece where the legs are gripping has a single or double curvature, or if it is at a different height than the part of the workpiece where the assembly operation is performed. It will be appreciated that the system may be adapted for more varied shapes of workpiece by suitable positioning and orientation of the groups of cups 122 relative to each other, or the cups 122 within each group relative to each other.

Figure 3:
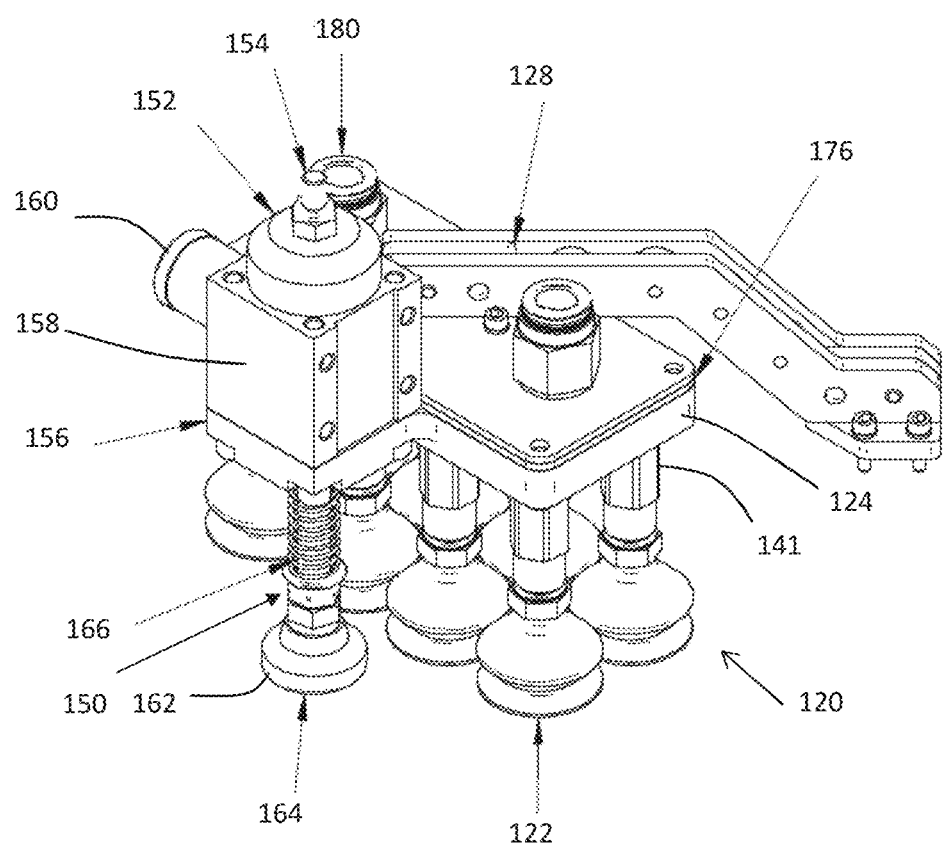
FIG. 3 is a detailed perspective view of a clamping module of the system of FIG. 1 with vacuum cups for clamping the tool to the work-piece.
Figure 4:
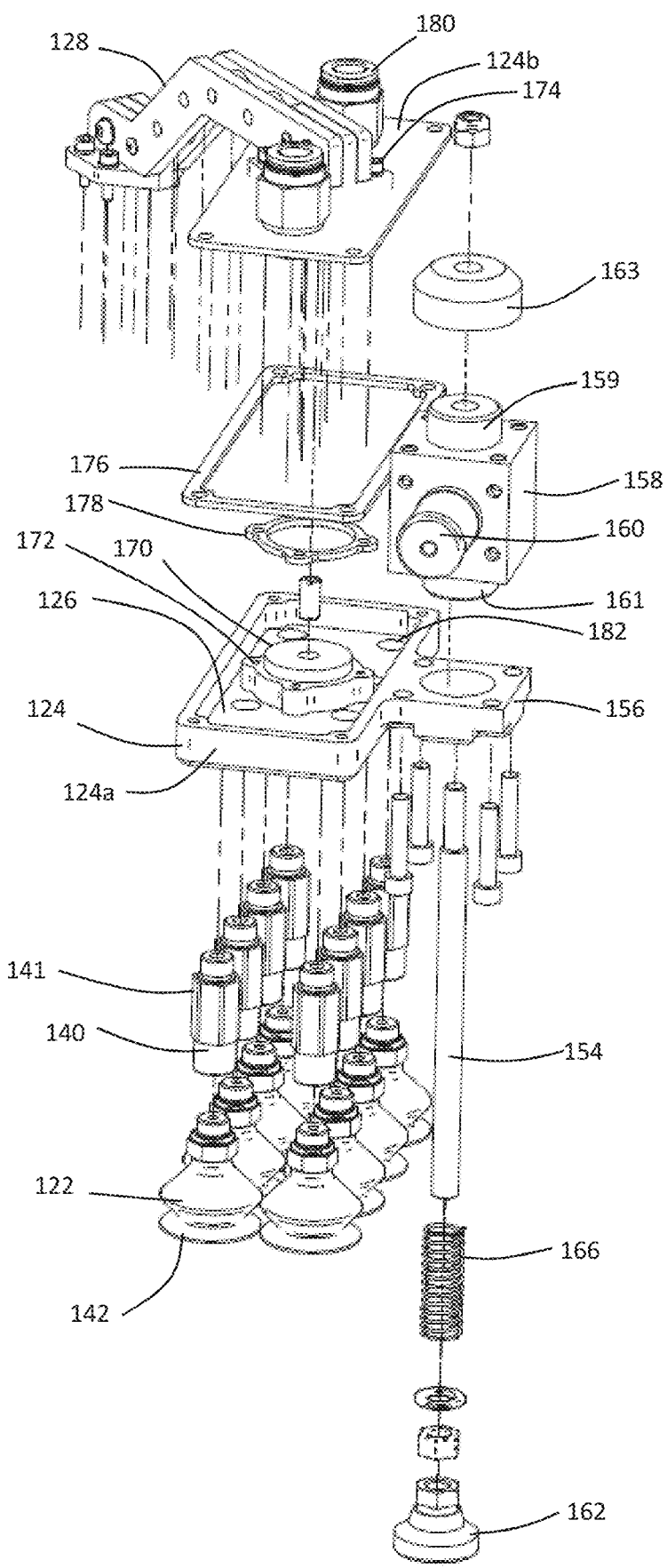
FIG. 4 is a detailed exploded view of the clamping module with vacuum cups of FIG. 3.
Figure 8:
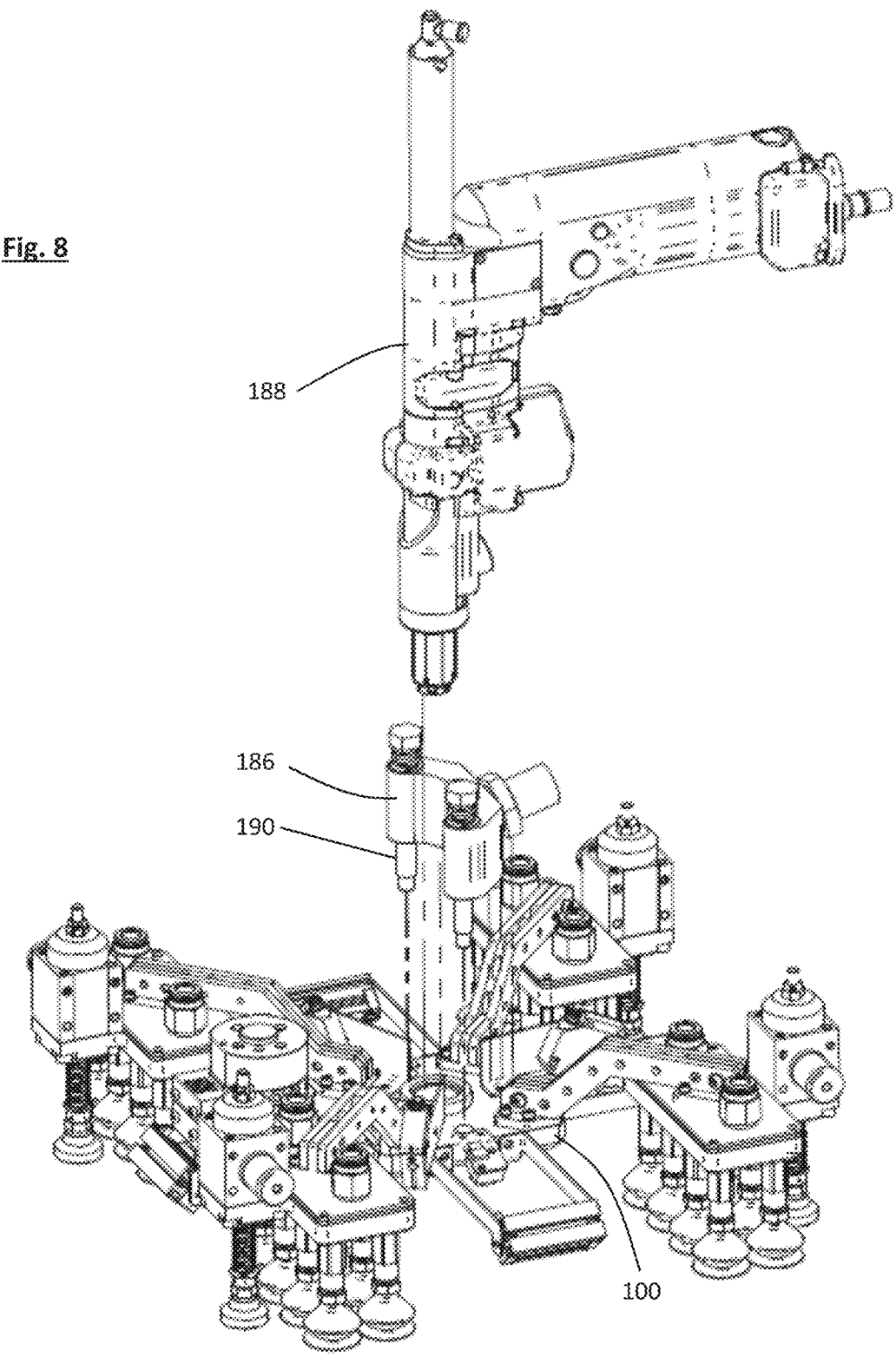
FIG. 8 is a detailed perspective view illustrating the integration of the clamping system and drilling unit.
Figure 9:
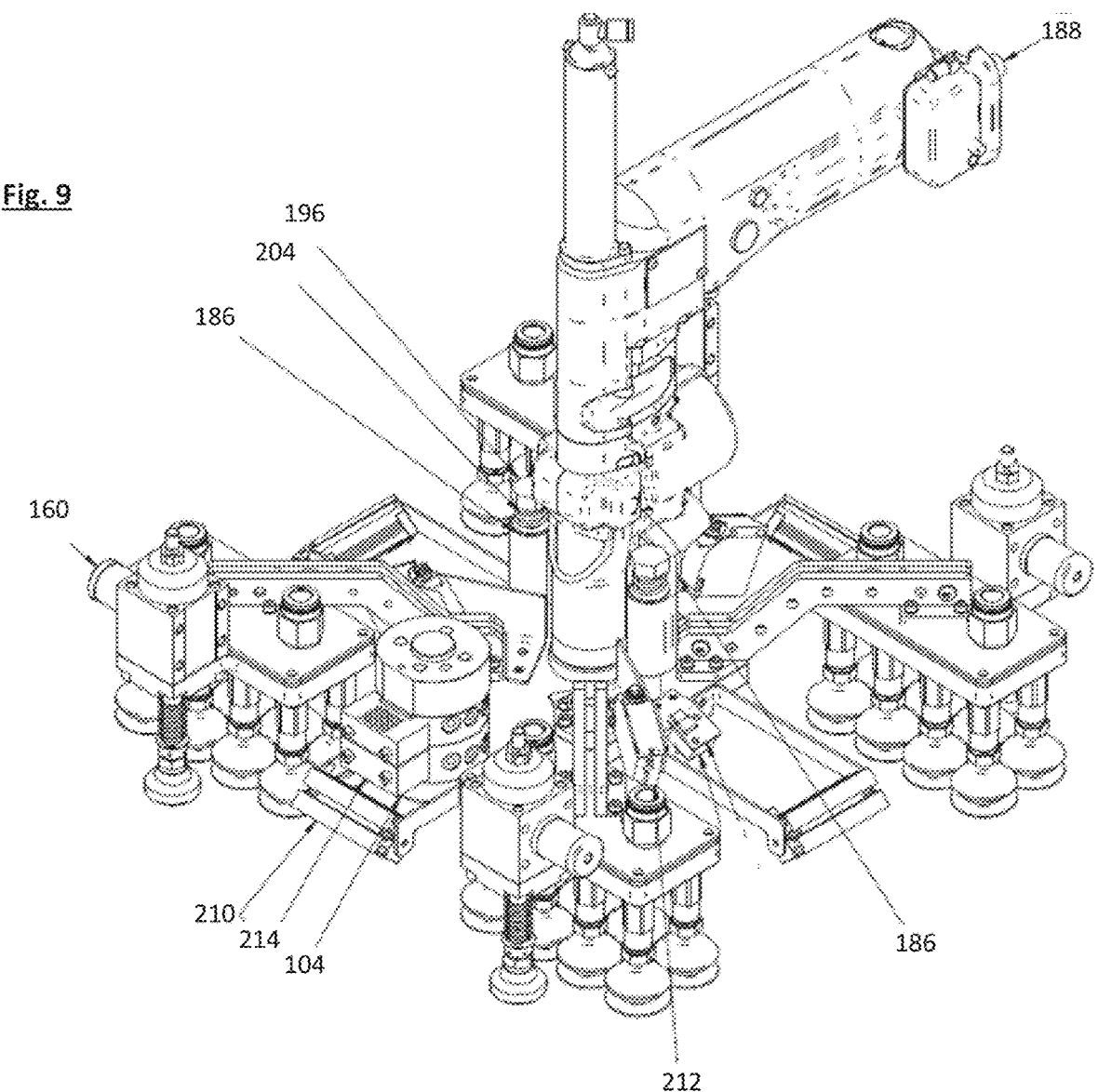
FIG. 9 is a further perspective view of the clamping system of FIG. 1 with a drilling unit connected to it.

Referring also to FIGS. 3 and 4, in each clamping module 120 there is also a contact member 150 which may be movable over a range of positions relative to the vacuum housing 124, and lockable in any one of those positions, for example by means of a pneumatic clamping valve 152. Other types of clamping mechanism including electrically or hydraulically activated ones may alternatively be used. The contact member 150 may comprise a shaft 154 which is slidably movable relative to the vacuum housing 124. The shaft 154 may be supported by a lug 156 projecting from one side of the main rectangular part of the vacuum housing and the clamping valve 152 may be mounted on the lug 156 so that the shaft 154 extends through the clamping valve 152 as well as through the lug 156. The clamping valve 152 may comprise a body 158 which houses the vacuum actuated clamping mechanism, and a vacuum port 160 which is connected to a source of vacuum whereby the clamping mechanism can be actuated to clamp the shaft 154 to lock it in in any position within its range of travel. The body 158 may have an annular bearing portion 159 formed on its top side, and a further annular bearing portion 161 formed on its lower side, each of the bearing portions 159, 161 having a circular aperture therethrough in which the shaft 154 is slidingly supported. A sliding seal 163 may be provided which fits over the upper bearing portion 159 and around the shaft 154 to provide a seal between the clamp body 158 and the shaft 154. The bearing portions 159, 161 and the shaft 154, may be arranged so that the longitudinal axis of the shaft, and therefore its direction of travel, is in the vertical direction, i.e., perpendicular to the plane in which the rims 142 of the suction cups 122 lie. The shaft 154 may have a foot 162 at its lower end, the underside 164 of the foot 162 being arranged to contact the workpiece. The foot 162 may be connected to the shaft 154 by means of a ball joint or other joint providing two rotational degrees of freedom so that the foot 162 can pivot relative to the shaft so that its underside 164 can rest firmly on the workpiece even if the surface of the workpiece is curved or otherwise not completely flat.

A spring 166, such as a coil spring, may be provided to bias the shaft 154 downwards, i.e., towards the workpiece in use. The lowermost limit of travel of the underside 164 of the foot 162 may coincide with, or be below, the plane of the rims 142 of the suction cups 122 when the suction cups are in the relaxed, non-activated, condition. The uppermost limit of travel of the underside 164 of the foot 162 may be level with, or above, the plane of the rims 142 of the suction cups when the vacuum cups 122 are in their most compressed condition.

The contact members 150 are arranged to locate the tool support 100 relative to the workpiece and react the clamping force of the vacuum cups 122 back to the workpiece, thereby reducing forces on the robotic arm on which the tool is supported. Regarding the number of contact members 150, a minimum of three are required to fix the position and orientation of the tool support 100, but four or more may be preferable in some cases.

As shown in FIG. 4, the vacuum housing 124 may be formed from a lower part 124*a* which includes the side walls and underside of the vacuum housing 124, and an upper part 124*b* which forms the upper side of the vacuum housing 124. A raised boss 170 may be formed on the center of the lower part 124*a*, having a number of threaded holes 172 formed in it. These may be aligned with holes in the upper part 124*b* through which fixing screws 174 can be inserted to fix the end of the support arm 128 to the vacuum housing 124. The top of the boss 170 may be level with the top of the side walls of the lower part 124*a*, so that when the two parts of the vacuum housing 124 are screwed together, the upper part 124*b* contacts the top of the boss 170. This provides a direct and rigid connection between the top and bottom of the vacuum housing 124 and the support arm 128 giving the vacuum housing a strong and rigid structure. A gasket 176 is provided and form a seal between the upper and lower parts of the vacuum housing 124, and a further gasket 178 is provided on top of the boss 170 around the threaded holes 172 to form a seal around the screw holes in the upper part 124*b* of the vacuum housing 124. The upper part 124*b* of the vacuum housing 124 may have one or more vacuum ports 180 formed in it whereby the vacuum chamber 126 can be connected to a vacuum supply.

The lower part 124*a* of the vacuum housing 124 may have a series of ports 182 formed in it each for connection to one of the vacuum cups 122. Specifically, each one of the cup connectors 140 with its integral auto-excluding valve 141 may have an upper end which is a screw fit into one of the ports 182 and a lower end which is a screw fit to the back of one of the vacuum cups 122 thereby providing pneumatic connection between the vacuum chamber 126 and each of the vacuum cups 122.

Figure 2:
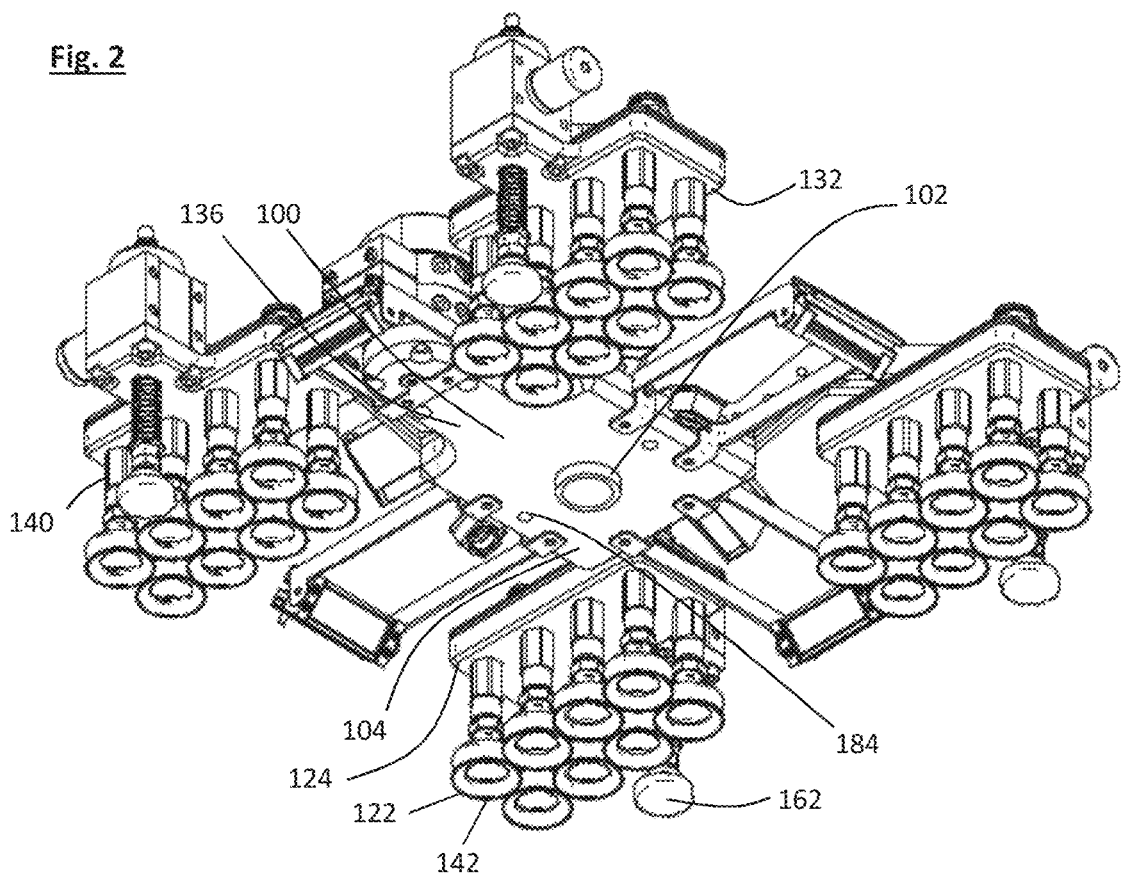
FIG. 2 is a perspective view from below of the clamping system of FIG. 1.

As can best be seen in FIG. 2, the support plate 104 may have threaded holes 184 formed in it for connection to a sliding connection 186 for a tool 188, such as a drill, as shown in FIGS. 5, 6, 7 and 8. The sliding connection 186 may comprise a pair of rails 190. Each of the rails 190 may comprise a shaft 192 with a threaded portion 194 at one end for locating in the threaded holes 184 in the support plate 104 and a head 196 at the other end, and a sliding connector 198. The rails 190 may be parallel to one another and extend in a vertical direction, and the connector 198 may comprise a bracket and may have two bearing portions 200 each slidingly mounted on a respective one of the rails 190 and a central mounting portion 202 extending between the bearing portions 200 arranged for connection to the tool 188. A coil spring 204 may be located around the top of each of the rails 190 acting between the head 196 and the bearing portion 200 of the connector 198. These springs 204 may bias the connector 186, and therefore also the drill 188 downwards relative to the tool support 100. Travel of the connector 186 is limited between an uppermost position (corresponding to an uppermost position of the tool 188 relative to the tool support 100) in which the coil springs 204 are fully compressed and a lowermost position (corresponding to a lowermost position of the tool 188 relative to the tool support 100) in which the connector 186 comes into contact with the tool support 100. Therefore, when the clamping system and tool are supported on the robotic arm and not in contact with the workpiece, the tool may be urged downwards to its lowermost position in the support.

Figure 10:
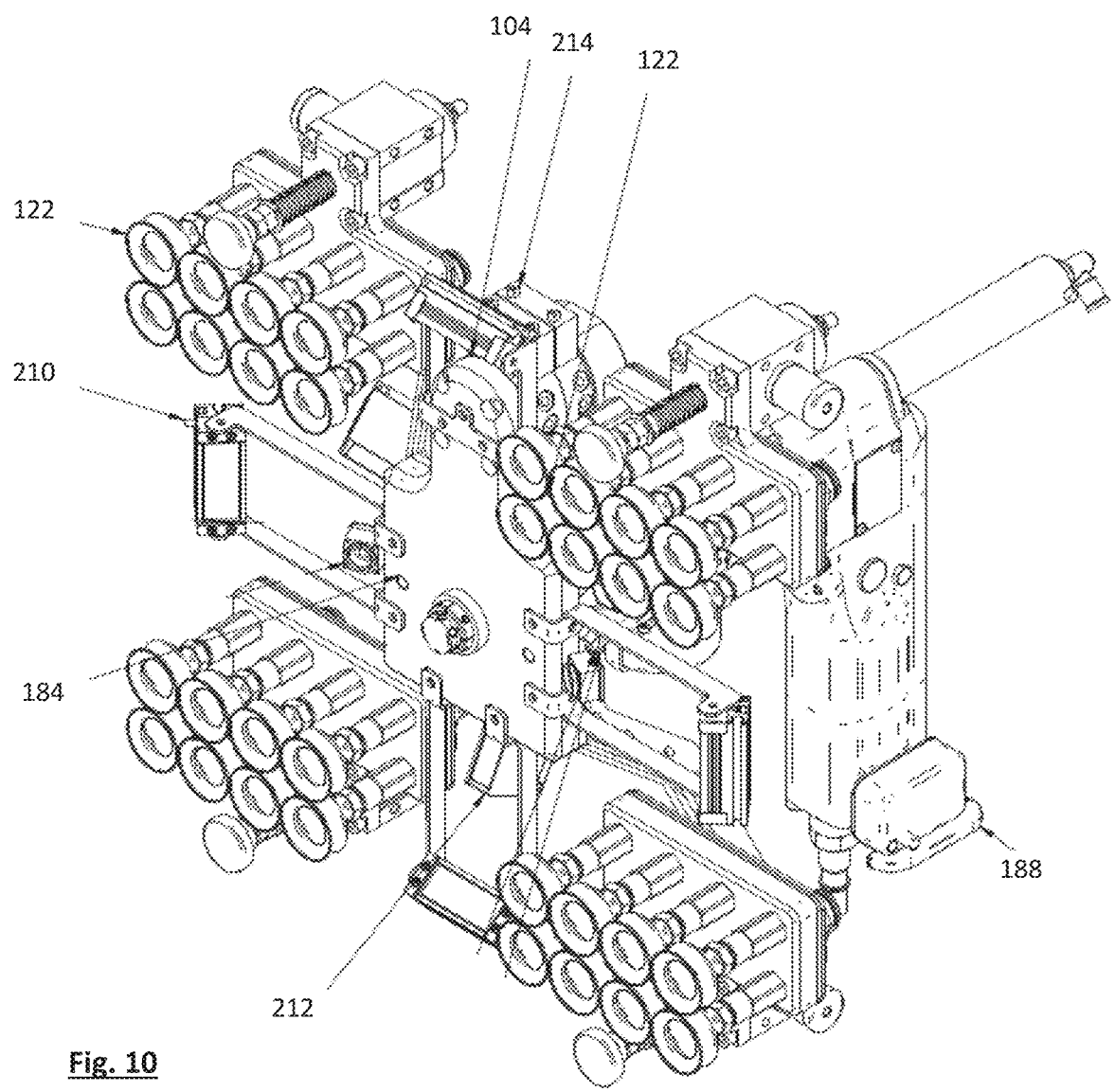
FIG. 10 is a detailed perspective view from below of the system of FIGS. 7, 8 and 9.

Referring to FIG. 10, various sensors or imaging devices may be mounted on the tool support 100 to enable the position of the tool support 100 to be determined. These may include 2D cameras 210 and laser optical sensors 212. These may be mounted on the tool support 100 by suitable brackets 214 and directed towards the region just below the bush 102 in the tool support 100 where the tool 188 will be operating on the workpiece when the clamping system is in place. They may provide simple distance sensing, or imaging, for example of one or more markers located on the workpiece, to enable the position and orientation of the tool support 100, and hence the tool 188, relative to the workpiece, to be determined. Further or alternative sensors may also be provided. For example, there may be sliding contact sensors 216 with linear encoders or linear variable differential transformers (LVDTs) mounted on the tool support 100 as shown in FIGS. 11 to 17.

Figure 11:
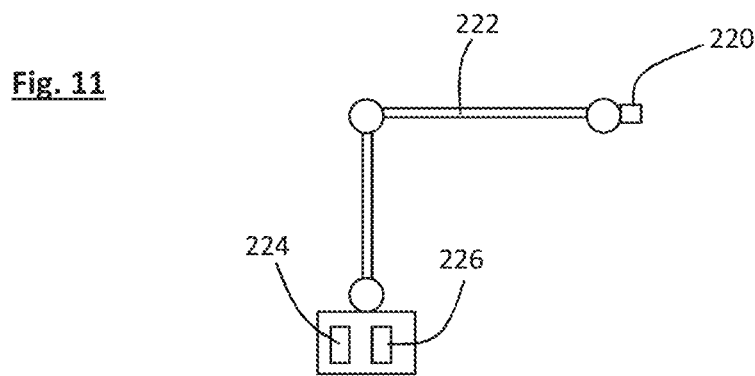
FIG. 11 is a schematic view of a robot system for use with the clamping system of FIGS. 1 to 10.

A connector, for example a quick tool exchanger 214, is rigidly connected to the tool support 100 and allows the clamping system to be releasably connected to an automatic traversing system such as an anthropomorphic robotic arm. As is well known in the art, the quick tool exchanger provides connections to all of the electrical, vacuum, or otherwise connected components of the clamping system. For example, the quick tool exchanger is connected to the vacuum ports 160, 180 for the vacuum clamps 158 and the vacuum chamber 126 for the vacuum cups, to the 2D cameras 210 and the laser optical sensors 212, and to the power supply and controls for the tool 188. These connections are not shown in the figures for simplicity. Referring to FIG. 11, a master-side component 220 of the quick tool exchanger is mounted on a robotic arm 222 which includes pneumatic and electrical connections to an electronic control unit 224 and a vacuum valve block 226 providing connections to a vacuum pump, so that, when the clamping system is connected to the robotic arm 222 by the quick tool exchanger, the vacuum operated components of the clamping system can be controlled by means of the valve block 226, which is controlled by the control unit 224 in response to data from the sensors 210, 212, 216.

Figure 12:
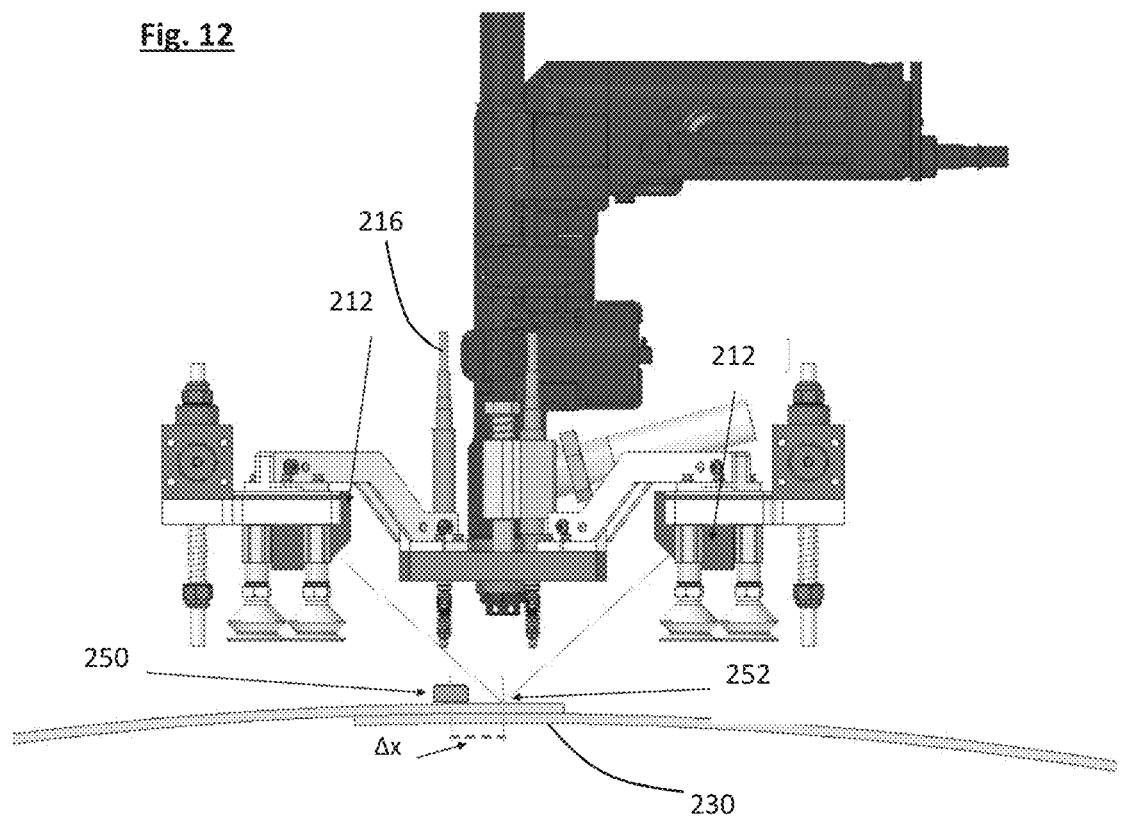
FIGS. 12 to 15 are schematic views representing the different steps required for the execution of the drilling task on aircraft fuselage panels by means of the clamping system of FIGS. 1 to 10.
Figure 13:
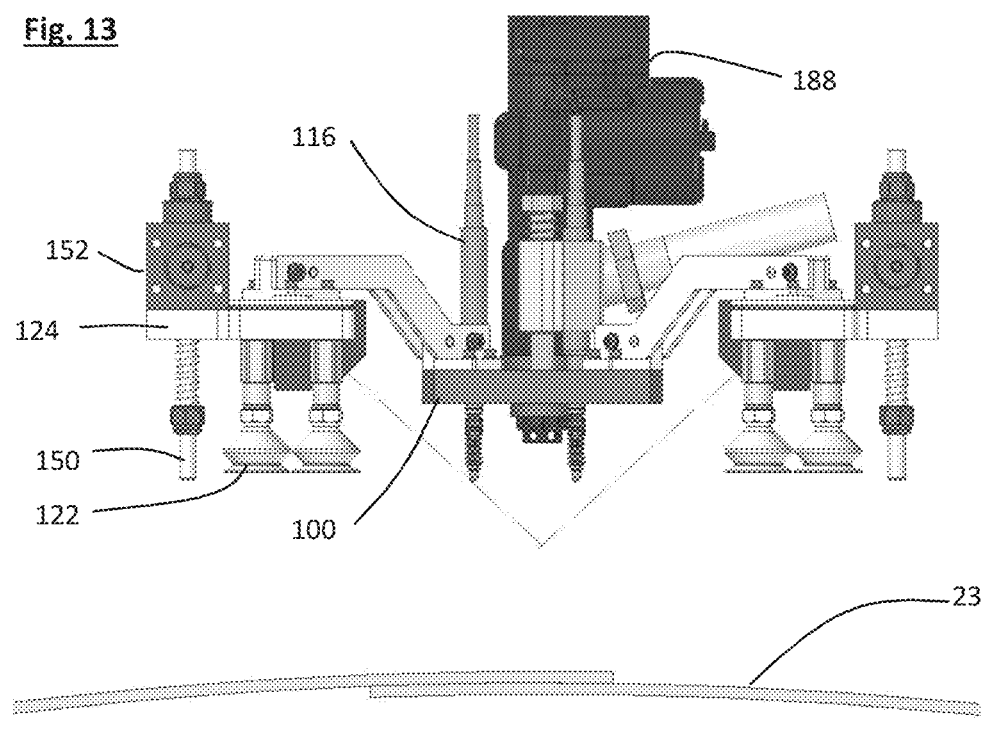
Figure 14:
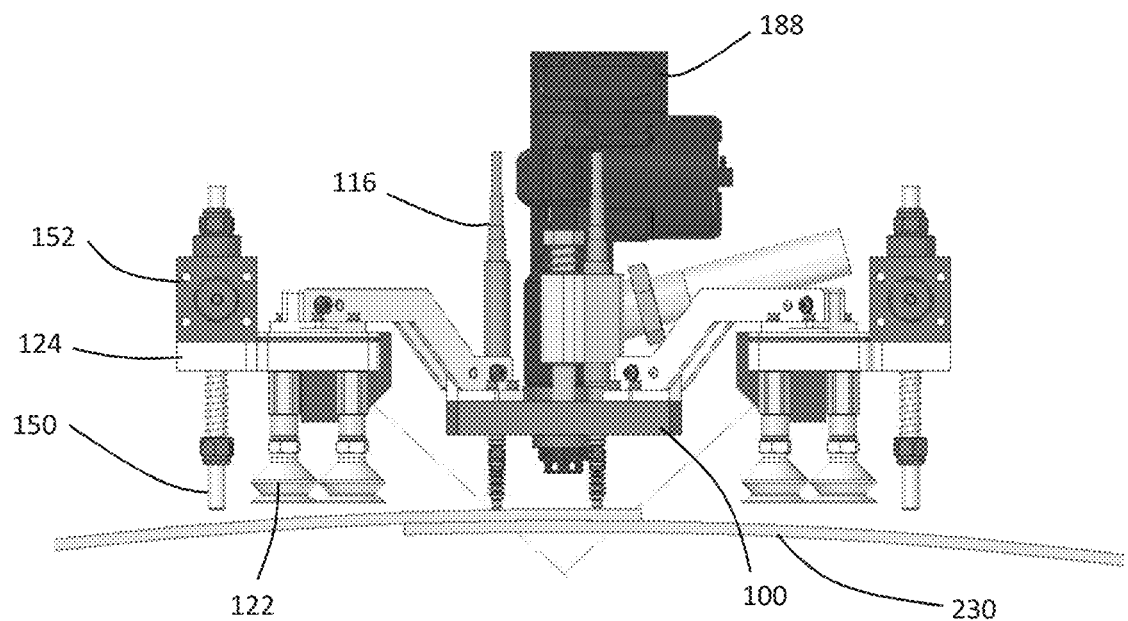
Figure 15:
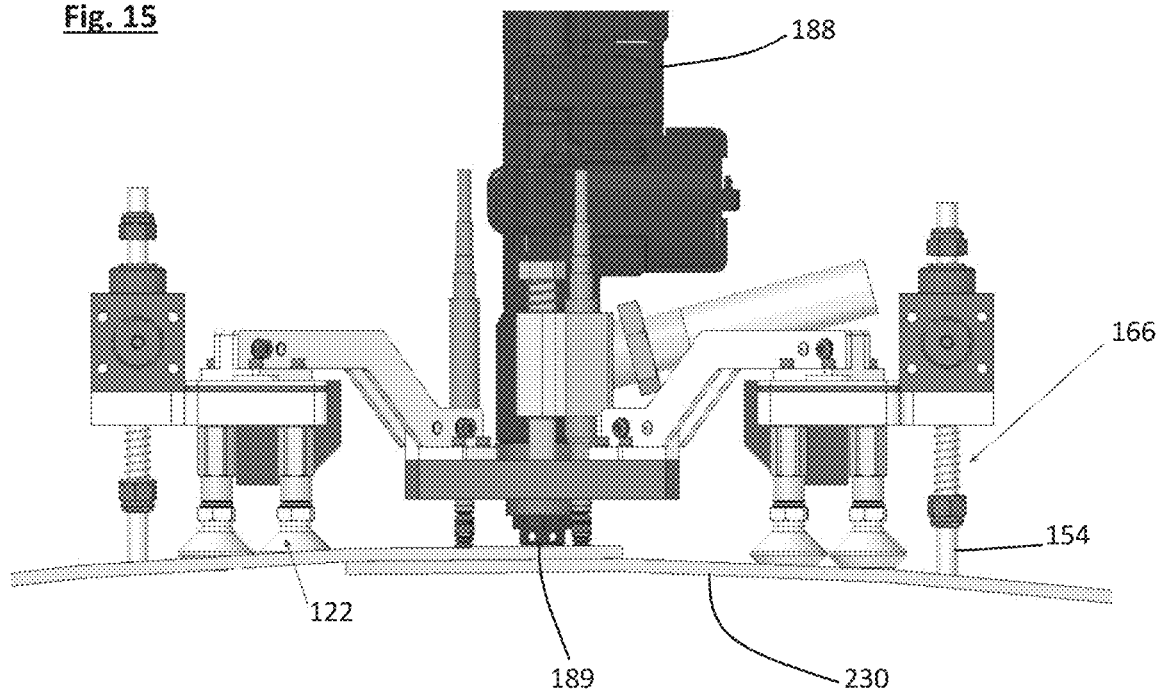

Operation of the system of FIGS. 1 to 11 will now be described with reference to FIGS. 12 to 18. All of the operations may be programmed into the electronic control unit 224 as is well known in the art. The light-weight robotic arm 222 is first controlled to position the clamping system, with a tool such as a portable pneumatic drilling unit 188, which is referred to purely as an example, mounted on it, close to the workpiece as shown in FIG. 12 and to perform a vision check in which the position of a reference point 250 is checked using the 2D cameras 210 and laser optical sensors 212 and compared to an expected position 252, thereby to determine the offset Δx between the expected and the measured positions, and the exact position of the workpiece 230 relative to the tool 188. The robot 222 is then controlled to move the tool 188 to a starting position as shown in FIG. 13. The robot 222 is then controlled to move from the starting position towards the workpiece 230 until all the distance sensors 210, 212, 216 used to check tool normality to the workpiece 230 give an appropriate feedback to the control unit 224, as shown in FIG. 14. Then the robot 222 pushes the vacuum cups 122 and the contact foot 162 of each leg against the surface of the workpiece 230 until the nose 189 of the drilling unit 188 is in contact with the panel surface as shown in FIG. 15. Once the drilling unit 188 has come into contact with the workpiece, the tool support 100 can be moved slightly closer to the workpiece during adjustment of the position of the tool support without the drilling unit being pushed further forward, the relative movement between the tool support 100 and the drilling unit 188 being accommodated by the sliding mounting 186 travelling along the drill rails 190. The contact between the nose 189 of the drill and the surface of the workpiece 230 is verified through the distance sensors 210, 212, 216. The vacuum cups 122 can be compressed as the tool 188 is moved towards the workpiece, and the contact feet 162 can move upwards from their fully extended position with the shafts 154 of the contact members sliding upwards through the clamping valves 152 against the force of the springs 166. The sliding stroke of the contact feet 162 allows the clamping system to adapt to possible variations in the height of the workpiece 230, still maintaining the normality (or more generally the required orientation) of the assembly tool 188 to the surface. In addition, the movement of the contact feet 162 permits full exploitation of the compression stroke of the vacuum cups 122 in order to adapt to curvatures of the surface of the workpiece 230 (such as in the case of drilling on the curved panels of an aircraft assembly).

At this point, the normality of the drilling tool's nose 189 with respect to the workpiece 230 is checked using the distance sensors 210, 212, 216, and, if necessary, adjustment and re-alignment is performed using the robot 122. Then the pneumatic clamping valves 152 of each leg are activated so to lock the height of the contact feet 162 and fix the distance between the tool 188 and the workpiece 230. Then, the vacuum cups 122 are activated by connecting the vacuum pump directly to the vacuum chamber 126 of each leg. This clamps the tool support 100 and the tool 188 to the workpiece 230, urging the contact feet 162 against the workpiece 230, without causing any movement of the tool because movement is resisted by the contact feet 162. The clamping arrangement with the locked contact members 150 allows the reaction forces necessary for the proper execution of the assembly operation to be completely absorbed by the vacuum clamping system rather than by the robotic arm 122. As a result, the clamping system can be mounted also on lightweight robotic arms, with a nominal payload much lower than reaction forces required for the correct execution of the operation.

In case of tool 188 being an advanced drilling unit (ADU) with concentric collet mechanism, the last step is the activation of the drill's collet: the collet expands, pushing the nose 189 of the drilling unit (which is already in contact with the work-piece) against the surface to be drilled. Finally, the drilling cycle can start. If the drilling unit 188 is be mounted on the clamping system through the sliding fixture 186 that can move along two drill rails 190, this permits the drilling unit 188 to move forward towards the work-piece 230 when the drill's collet is activated and holds the nose 189 of the drill inside the bush 102 of the tool support 100. When the drill's collet is de-activated, the drilling unit 188 can slide back along the drill rails 190.

In a modification of the embodiment shown in the drawings, the contact members 150 may be fixed relative to the vacuum housing 124, or indeed omitted altogether, and the adjustment mechanism may be arranged to adjust the position of the tool support relative to the vacuum cups. For example, a height adjustment mechanism may be provided between each of the vacuum chamber housings 124 and the support arm 128 to which it is connected. The adjustment mechanism can in this case again comprise a sliding shaft and vacuum clamping valve.

In FIGS. 16 to 20, a further embodiment is shown. This is similar to the embodiment of FIGS. 1 to 15 and corresponding components are indicated by corresponding reference numerals by increased by 200. Referring to FIGS. 16 to 20, as indicated above, each of the clamping modules 320 may be mounted on the tool support 300 by means of a sliding mounting mechanism which allows the clamping module 320 to move vertically relative to the tool support 300. For example, each clamping module 320 may comprise a contact member 350 in the form of a tripod comprising three legs mounted on the vacuum housing 324. The vacuum housing 324 may be mounted on a shaft 354 which is slidingly mounted in a bearing in the tool support 300. The shafts 354 of all of the clamping modules may be parallel to each other and arranged to slide in the vertical direction through the tool support 300. This means that when the clamping modules 350 are clamped to the workpiece, the tool support 300 can slide towards and away from the work piece on the shafts 354. The shafts may be biased downwards relative to the tool support 300 by springs 366, which may be coiled around the shafts 354 and held in compression between the tool support 300 and the vacuum housings 324, and locked in place relative to the tool mounting by means of clamping devices, such as pneumatic clamping valves 352. The tripod contact members 350 may be mounted on the shafts 354 by means of ball joints or other joints providing two degrees of rotational freedom so that the tripods can pivot on the shafts allowing all three legs of the tripod to contact the workpiece even if the workpiece is curved or inclined to the tool support 300.

Figure 16:
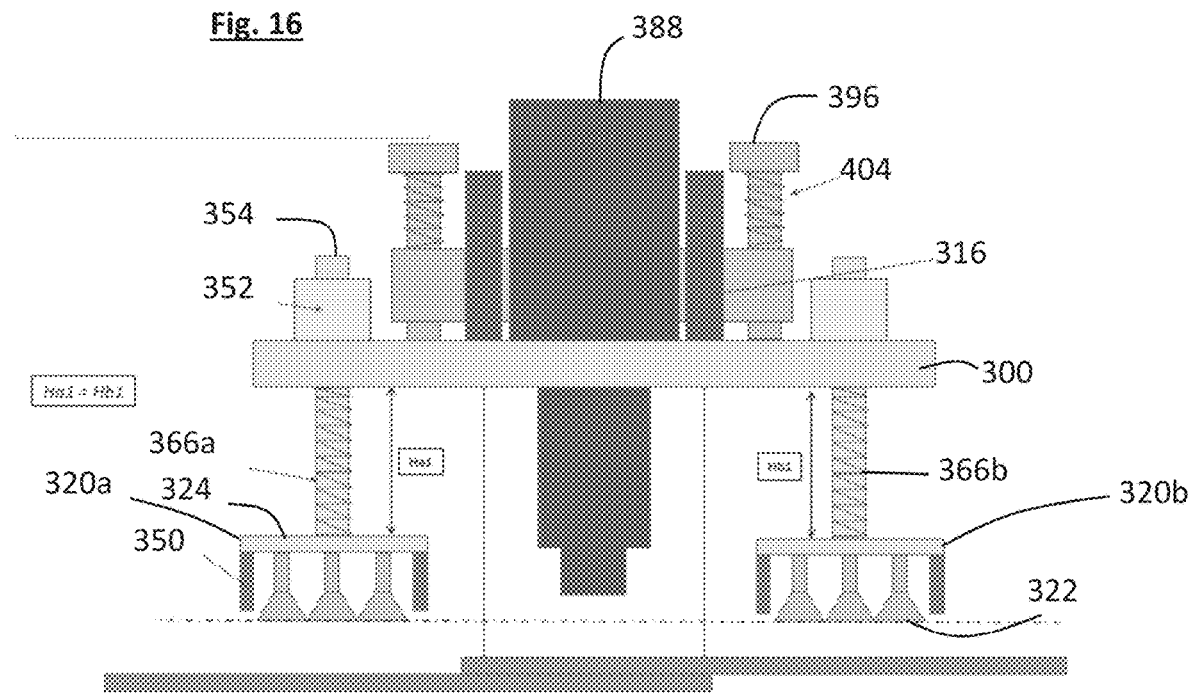
FIG. 16 is a side view of a clamping system according to a further embodiment of the invention as it approaches a workpiece.

Referring to FIG. 16, as the robotic arm moves the tool 388 towards the workpiece the contactless sensors 316 measure the distance to the workpiece and the control unit uses signals from the sensors 316 to check the alignment of the tool 388 with the workpiece as well as its distance from the workpiece. At this point, considering two of the clamping modules 320a and 320b, the springs 366a, 366b are both fully extended and the two clamping modules are equally spaced from the tool support so that Ha1=Hb1 as shown.

Figure 17:
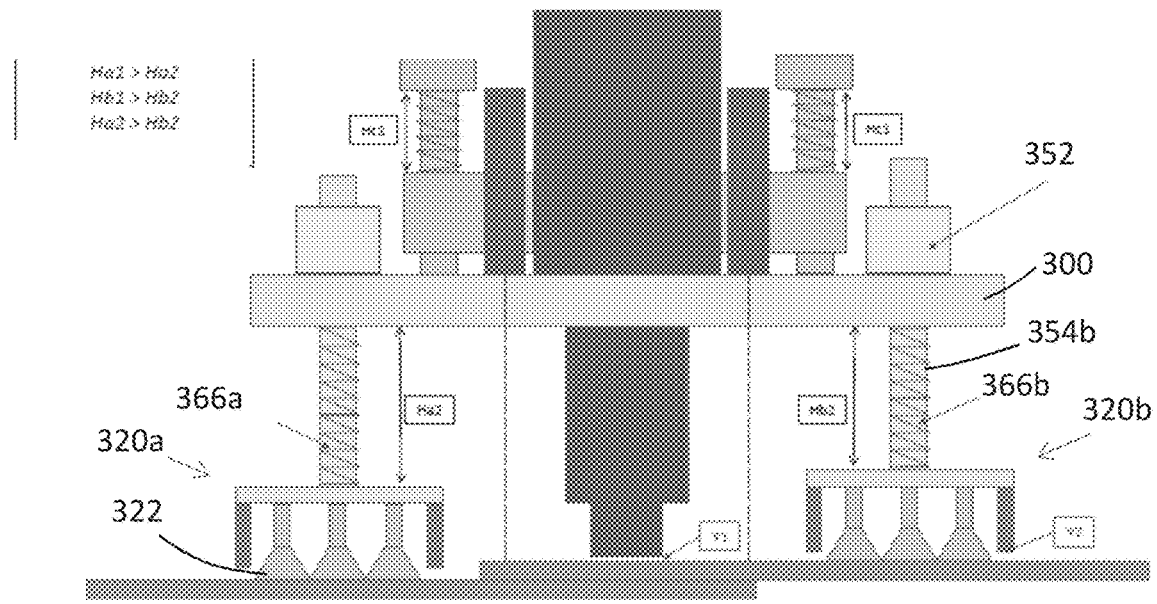
FIG. 17 is a side view of the system of FIG. 16 as it makes contact with the workpiece.

Referring to FIG. 17, as the tool support 300 is moved closer to the workpiece, the suction cups 322 contact the workpiece. If, as shown in FIG. 17, the workpiece is uneven, one of the clamping modules 320b will contact the workpiece before the other 320a, and therefore the tool support 300 will slide down the shaft 354b of that clamping module, compressing the spring 366b and reducing the distance Hb between that module 320b and the tool support 300, until the second clamping module 320a contacts the workpiece. The spacing Ha of the second clamping module 320a from the tool support 300 is then greater than Hb, i.e., Ha2>Hb2. At this point, the tripod contact members 350a, 350b are spaced from the workpiece by a distance Y2 and the nose of the drill 388 is spaced from the workpiece by a distance Y1. When adjustment of the drill position is complete, the vacuum clamping units 352 are then activated to clamp the shafts 354 of the clamping modules to the tool support 300.

Figure 18:
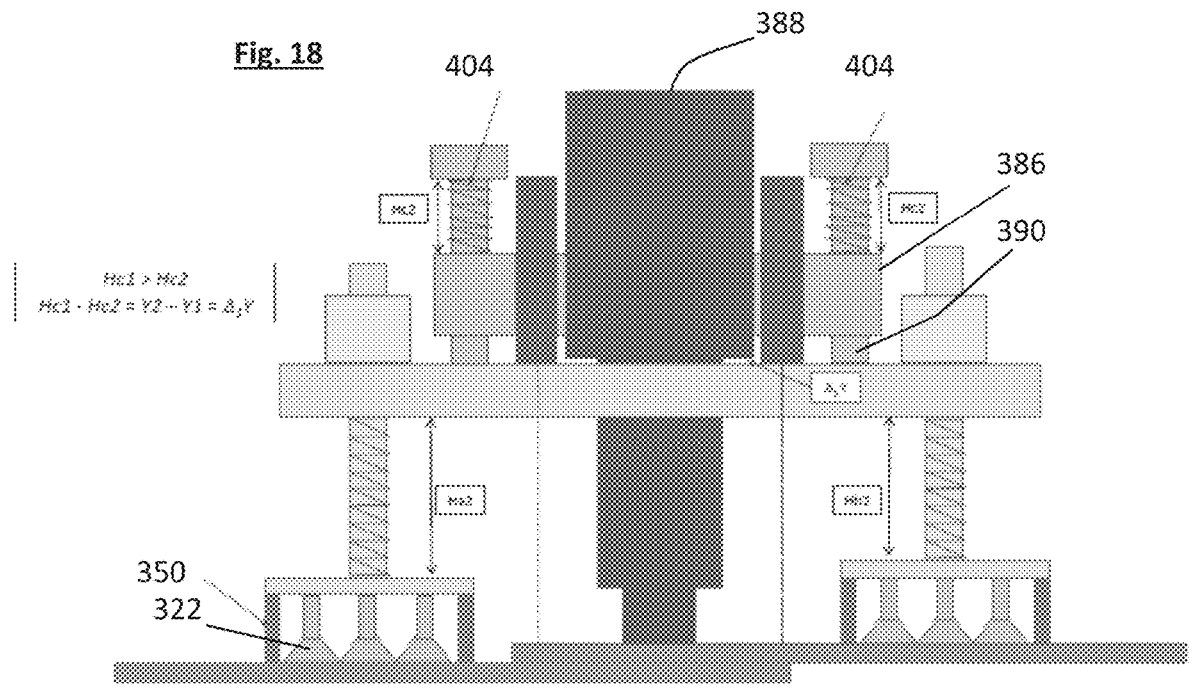
FIG. 18 is a side view of the system of FIG. 16 clamped to the workpiece.

Referring to FIG. 18, the vacuum cups 322 are then activated which first pulls the nose of the drill 388 into contact with the workpiece. As the tool support 300 is moved further by activation of the vacuum cups 322, the drill 388 will remain stationary and the springs 404 will be compressed as the drill rails 390 slide downwards through the sliding connection 386 by a distance $\Delta_1 Y$. At the same time the movement pulls the legs of the tripod contact members 350 into contact with the workpiece. If the tripods are mounted on ball joints all three legs of each contact member will contact the workpiece. The force $F_{nose}$ applied by the nose of the drill 388 on the workpiece then depends on the spring coefficient $k_c$ of the springs 404 and the distance by which they are compressed $\Delta_1 Y$:

$$F_{nose}=2(k_c \Delta_1 Y)$$

In a modification to this process, the clamping units 352 are not activated until after activation of the vacuum cups. However, it can be advantageous for the vacuum cups to be used to bring the drill into contact with the workpiece.

Figure 19:
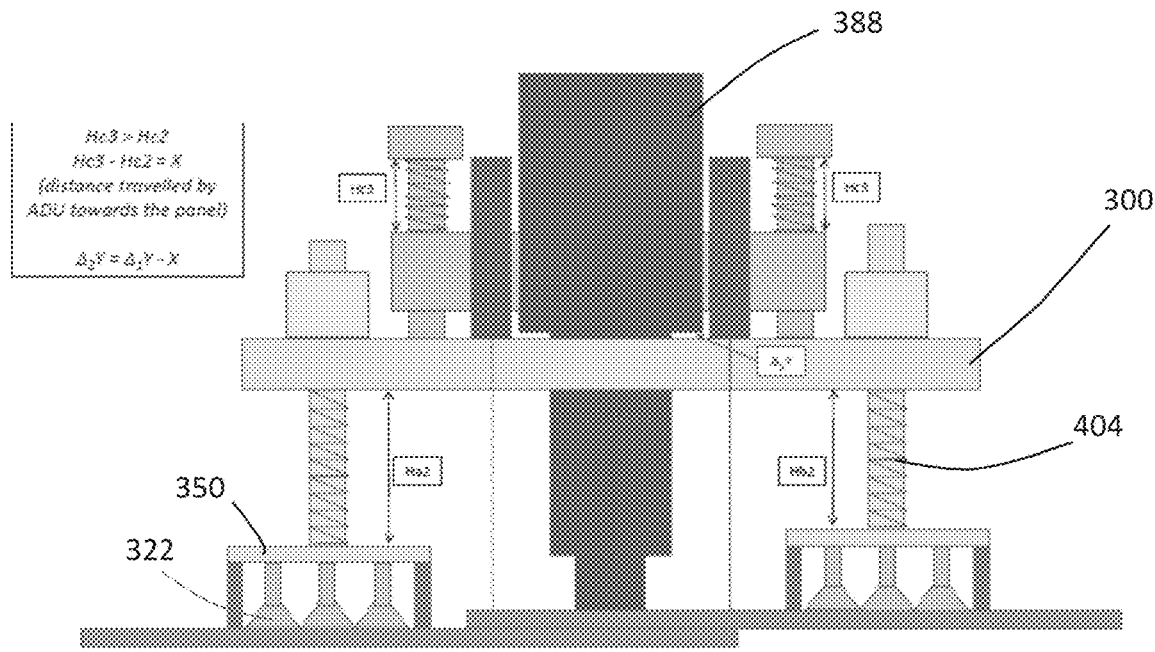
FIG. 19 is a side view of the system of FIG. 16 with the drill fully engaged with the workpiece.
Figure 20:
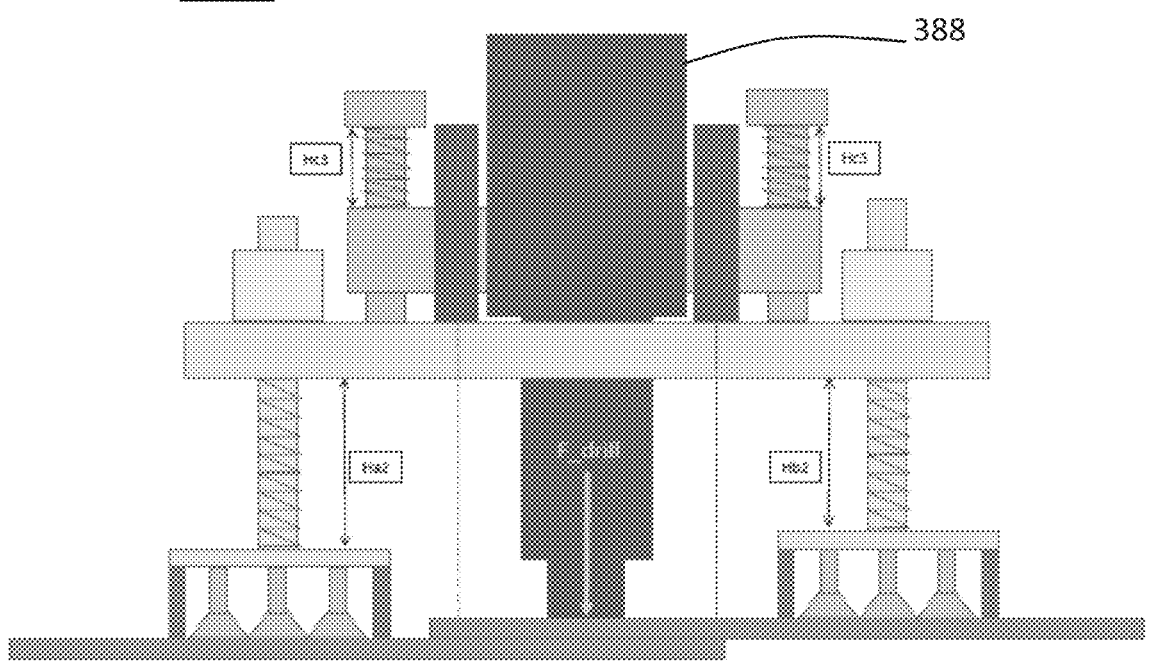
FIG. 20 is a side view of the system of FIG. 16 with the drill in operation on the workpiece.

Referring to FIG. 19, the collet of the ADU 388 is then activated which moves the drill 388 slightly towards the workpiece by a distance X. This reduces the compression of the springs 404 to a smaller amount $\Delta_2 Y$. Finally, referring to FIG. 20 the drill 388 is operated.

As with the embodiment of FIGS. 1 to 15, it will be appreciated that the embodiment of FIGS. 16 to 20 can be varied in many ways. For example, in either case the vacuum operated suction cups can be replaced by electromagnets or van der Waals clamps. Obviously in this case the vacuum chambers and pneumatic connections will not be required and will be replaced by suitable electrical control and connections. Such clamping devices generally will produce little or no movement of the clamping modules on activation of the clamping devices, unlike the vacuum cups as described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus for clamping a robotically controlled tool to a workpiece, the apparatus comprising:
   a tool support configured to be mounted on a robotic arm and arranged to support the tool;
   a plurality of clamping modules each of which includes at least one clamping device configured to clamp the tool support to the workpiece and an adjustment mechanism configured to allow adjustment of the position of the tool support relative to the workpiece,
   wherein the tool support is mounted on the robotic arm and the robotic arm is configured to move the tool support to bring the clamping devices into contact with the workpiece,
   wherein each at least one clamping device comprises a plurality of vacuum cups mounted on a common mounting member which comprises a respective vacuum chamber housing defining a vacuum chamber connected to all of the plurality of vacuum cups.

2. The apparatus according to claim 1, wherein the adjustment mechanism comprises a contact member movable relative to the tool support to allow relative movement of the tool support and the workpiece while the contact member is in contact with the workpiece, and the apparatus further comprises a lock configured to lock each of the contact members relative to the tool support so as to fix the location of the tool support relative to the workpiece during activation of the clamping devices.

3. The apparatus according to claim 2, wherein each of the contact members comprises a shaft that is slidably mounted on the tool support.

4. The apparatus according to claim 2, wherein each of the contact members is movable between an extended position in which the contact member will first contact the workpiece and a retracted position, and is spring biased towards the extended position.

5. The apparatus according to claim 1, wherein each of the vacuum cups of each module is connected to the vacuum chamber via an auto-excluding valve configured to disconnect the vacuum cup from the vacuum chamber in the event of a leak in the vacuum cup.

6. The apparatus according to claim 1, wherein, in each of the clamping modules, the plurality of vacuum cups are mounted on the vacuum chamber housing, and the vacuum chamber housing is rigidly connected to the tool support.

7. The apparatus according to claim 1, further comprising at least one sensor positioned to sense a position of the tool support relative to the workpiece.

8. The apparatus according to claim 1, wherein the tool support comprises a sliding mounting arranged to mount the tool on the tool support so that the tool is movable on the sliding mounting relative to the tool support.

9. The apparatus according to claim 8, wherein the sliding mounting comprise a spring arranged to bias the tool towards the workpiece.

10. The apparatus according to claim 9, further comprising an electronic control unit and a vacuum pump, wherein the tool support is mounted on the robotic arm by means of a connector configured to connect the clamping devices to the vacuum pump.

11. The apparatus according to claim 10, and further comprising at least one sensor positioned to sense a position of the tool support relative to the workpiece, wherein the connector is arranged to connect the at least one sensor to the electronic control unit.

12. A method of clamping a robotically operated tool to a workpiece, the method comprising:
  a. providing the apparatus according to claim 1, with a tool mounted on the tool support;
  b. moving the tool support to a position where the clamping devices are in contact with the workpiece; and
  c. activating the clamping devices to clamp the tool to the workpiece.

13. A method according to claim 12, wherein the adjustment mechanism comprises a contact member movable relative to the tool support to allow relative movement of the tool support and the workpiece while the contact member is in contact with the workpiece, and the apparatus further comprising a lock configured to lock each of the contact members relative to the tool support so as to fix the location of the tool support relative to the workpiece during activation of the clamping devices, and wherein when the tool support is in said position the contact members also contact the workpiece, the method further comprising locking the contact members relative to the tool support prior to activating the clamping devices.

* * * * *